United States Patent [19]

Osawa

[11] Patent Number: 4,850,720
[45] Date of Patent: Jul. 25, 1989

[54] LINEAR GUIDE APPARATUS

[75] Inventor: Nobuyuki Osawa, Takasaki, Japan

[73] Assignee: Nippon Seiko Kabushiki Kaisha, Tokyo, Japan

[21] Appl. No.: 228,570

[22] Filed: Aug. 4, 1988

[30] Foreign Application Priority Data

Aug. 7, 1987 [JP] Japan .................. 62-121042[U]

[51] Int. Cl.⁴ .................................. F16C 29/06
[52] U.S. Cl. ........................ 384/13; 384/15; 384/45
[58] Field of Search ............ 384/13, 15, 45, 43, 384/44; 464/168

[56] References Cited

U.S. PATENT DOCUMENTS

| | | | |
|---|---|---|---|
| 4,411,478 | 10/1983 | Olschewski et al. | 384/15 |
| 4,472,003 | 9/1984 | Osawa . | |
| 4,479,681 | 10/1984 | Suzuki | 384/13 |
| 4,582,369 | 4/1986 | Itoh | 384/13 |
| 4,616,885 | 10/1986 | Komiya | 384/15 |

*Primary Examiner*—Lenard A. Footland
*Attorney, Agent, or Firm*—Basile and Hanlon

[57] ABSTRACT

A linear guide apparatus includes end caps respectively joined to opposite ends of a slider main body. In each of the end caps, a feed oil channel is formed in the joining end surface thereof to feed lubricating oil to balls rolling in ball rolling paths from a feed oil nipple. Band-shaped protrusions are formed on lands at both sides of the feed channel integrally with the end cap at the time of injection molding of the end cap of synthetic resin. When the end cap is fixed to the slider main body by clamping a screw, the band-shaped protrusions are deformed elastically to fill up a minute gap existing between both end surfaces of the end cap and the slider main body to prevent leakage of the lubricating oil.

2 Claims, 2 Drawing Sheets

LINEAR GUIDE APPARATUS

BACKGROUND OF THE INVENTION

1. Field of the Invention

The present invention relates to a linear guide apparatus including a guide rail, a slider travelling freely on the guide rail, a ball circulating paths for balls which are interposed between the guide rail and the slider, and in particular, to a linear guide apparatus designed to prevent the leakage of lubricating oil supplied to the ball circulating paths.

2. Description of the Relevant Art

A prior art linear guide apparatus of this type is disclosed, for example, in U.S. Pat. No. 4,472,003.

The linear guide apparatus includes an elongated guide rail having ball rolling grooves formed in both side surfaces extending in the axial direction, a slider main body mounted to straddle the guide rail and movable in relation thereto, and having ball rolling grooves formed respectively opposing the ball rolling grooves of the guide rail and having axial through holes, serving as ball passages, formed in parallel with the ball rolling grooves, end caps fixed respectively to opposite ends of the slider main body, and a multiplicity of balls rollably inserted in the ball rolling grooves. Each of the end caps has ball circulating paths of a half-doughnut shape respectively extending between a corresponding ball rolling groove and a through hole of the slider body, and has a feed oil channel for feeding oil to the ball circulating paths.

When the slider moves on the guide rail in the axial direction, the balls pass through the through holes and the ball circulating paths and rollably circulate through the ball rolling grooves, allowing the slider to move smoothly in the axial direction. In this case, lubricant is supplied to the balls in the ball circulating paths through the feed oil channel provided in the end cap. As a result, smooth rolling of the balls can be insured.

However, the feed oil channel in the end cap of the prior art linear guide apparatus is a mere recessed channel formed in a plane portion of the end surface of the end cap in contact with the end surface of the slider main body. Consequently, even when small screws are used to fix the end cap to the slider main body, it is difficult to bring both the end surfaces of the slider and the end cap into close and complete contact with each other due to errors in the geometry such as surface finishes and flatness of both the end surfaces. As a result, a minute gap is caused between the end surfaces. In this case, if grease is used as the lubricant, there will be no problem, but if liquid lubricating oil is used, it tends to leak to the outside of the feed oil channel.

In particular, when the oil is supplied from the lower end cap with the guide rail in a perpendicular condition, the oil will leak from the contact surface, of the end cap with the guide rail, and sufficient oil will not be supplied to the balls. As a result, the problem is involved in that the life of the linear guide apparatus is shortened.

SUMMARY OF THE INVENTION

It is an object of the present invention to solve the problems in the prior art and to provide a linear guide apparatus in which leakage is not caused even when liquid lubricating oil is used.

A linear guide apparatus of the present invention which achieves the above object includes an elongated guide rail having ball rolling grooves formed in both side surfaces, a slider main body movably mounted, in a straddling relationship, on the guide rail, having ball rolling grooves respectively opposing to the ball rolling grooves of the guide rail and having through holes as ball passages parallel to the ball rolling grooves of the slider main body, end caps respectively joined to opposite end surfaces of the guide rail, each of the end caps having ball circulating paths for connecting corresponding ball passages to the ball rolling grooves of the slider main body and having a feed oil channel for feeding oil to the ball circulating paths, and a multiplicity of balls rollably inserted in the ball rolling grooves. In the present invention, band-shaped protrusions are formed integrally on lands along both sides of the feed oil channel, thereby to prevent leakage of the lubricating oil from the oil feed channel.

When the end cap is applied to the end surface of the slider main body and small screws are used to fix the end cap to the slider main body, the band-shaped protrusions are deformed elastically due to the clamping pressure and fill up a gap between the end cap and the slider main body thereby acting to prevent the liquid lubricating oil from leaking out of the feed oil channel.

DESCRIPTION OF THE PREFERRED EMBODIMENTS

Figure 1:
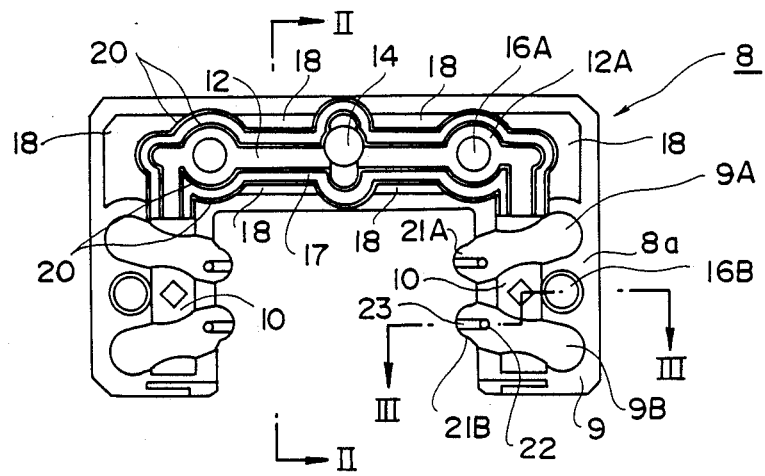
FIG. 1 is a rear view of an end cap in an embodiment of the present invention.
Figure 2:
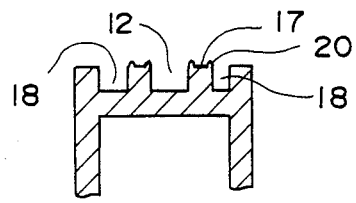
FIG. 2 is a sectional view taken along line II—II in FIG. 1.
Figure 3:
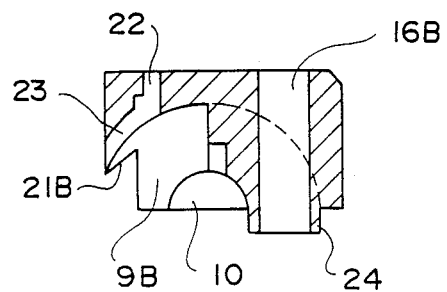
FIG. 3 is a sectional view taken along line III—III in FIG. 1.

FIGS. 1 to 5 illustrate an embodiment of the invention. A slider 2 having an inverted U-shaped cross section is mounted on a guide rail 1, straddling and movable relative to the guide rail 1. The guide rail 1 has two ball rolling grooves 3A and 3B of a semi-circular cross section formed in each of both side surfaces. In each of the ball rolling grooves 3A and 3B, there is formed an escape channel 3a in the bottom of the groove which extends in the axial direction to accommodate therein a wire-shaped retainer W for preventing balls B from falling off the groove.

On the other hand, a main body 2A of the slider 2 is formed with ball rolling grooves 5A and 5B in the inner surface of each side wall 4 of the main body 2A so that the ball rolling grooves 5A and 5B correspond respectively to the ball rolling grooves 3A and 3B of the guide rail 1. These mutually corresponding ball rolling grooves constitute ball rolling paths 6A and 6B. The slider main body 2A further has ball passage holes 7A and 7B of a circular cross section formed in each of the side walls 4 penetrating therethrough in the axial direction. The ball passage holes 7A and 7B are respectively in parallel with the ball rolling paths 6A and 6B.

End caps 8 are respectively joined to opposite ends of the slider main body 2A, and are formed by injection molding of a synthetic resin material. Each of the end caps 8 has a cross section of an inverted U-shape similar to that of the slider main body 2A. Ball circulating paths 9A and 9B, of a semi-circular shape, are formed in each of both side leg portions in an end surface 8a which is in contact with an end surface 2a of the slider main body 2A. The ball circulating path 9A brings the ball rolling path 6A and the ball passage hole 7A in communication with each other, and the ball circulating path 9B brings the ball rolling path 6B and the ball passage hole 7B in communication with each other.

In each of the side leg portions 9 of the end cap 8, there is formed a recessed groove 10 of a semi-cylindrical shape which crosses the center portions of the ball circulating paths 9A and 9B in the vertical direction. A return guide 11, of a hollow semi-cylindrical shape, is secured to the end surface 2a of the slider main body 2A. The return guide 11 forms an oil channel 11a defined by the inner surface thereof and a through hole 11b is formed which extends axially between the inner surface and the outer surface of the return guide 11. When the end surface 8a of the end cap 8 is joined to the end surface 2a of the slider main body 2A, the return guide 11 is fitted into the recessed groove 10 so that the ball circulating paths 9A and 9B are formed respectively in half-doughnut shapes.

In the end surface 8a of the end cap 8, there is formed a feed oil channel 12 which brings the recessed grooves 10 of both side leg portions of the end cap 8 in communication with each other. The feed oil channel 12 is also in communication with a hole 14 for mounting a feed oil nipple 13 therein. Through holes 16A and 16B are formed in the end cap 8 for fixing the end cap 8 to the slider main body 2A with screws 15. Through hole 16a, which penetrates the feed oil channel 12, has a spot facing to form an annular feed oil channel 12A so that lubricant being supplied can pass around screw 15.

The feed oil channel 12, which is formed in the end surface of the end cap 8 at the contact side thereof, includes straight portions and annular portions and, in addition, flat land portions 17 exist at both sides of the feed oil channel 12. In the flat land portions, recesses 18 are formed at a plurality of dispersed portions to reduce the mass of the flat lands.

As a result, a flat land 17 of a band shape is formed at each side of the feed oil channel 12 between the feed oil channel 12 and the mass-reducing recess 18.

Both side edges of the band-shaped land 17, more specifically in this embodiment, the edge portions of both sides of the feed oil channel 12, and the edge portion of the land 17 facing or adjoining the mass-reducing recess 18, are raised slightly above the upper surface of the land 17. Consequently, two parallel band-shaped protrusions 20 located at each side of the feed oil channel 12 and spaced with a predetermined distance therebetween are formed on the land 17. These band-shaped protrusions 20 are formed integrally with the land 17 at the time of injection molding by engraving the shape of the protrusion 17 in a mold tool for the injection molding.

Further, the inner end portions of the ball circulating paths 9A and 9B which guide the rolling balls B outwardly from ball rolling paths 6A, 6B are formed to protrude in a semi-circular shape, and ball scooping protruding portions 21A and 21B are formed so that acute tip ends thereof are fitted into the ball rolling grooves 3A and 3B respectively. Wire holding holes 22 are formed at the base portions of the ball scooping protrusions 21A and 21B to hold the ends of the wire retainers W which are inserted axially in the wire holding holes 22. Moreover, wire escape channels 23 are formed which extend respectively from the tip ends of the ball scooping protrusions 21A and 21B to the wire holding holes 22.

A guide protrusion 24 is formed around through hole 16B at the joining side of each leg portion of the end cap 8. This guide protrusion 24 ensures accurate joining of the end cap 8 to the slider main body 2A so that the ball circulating paths 9A and 9B are smoothly connected at both ends thereof to the ball rolling passages 6A and 6B and to the ball passage holes 7A and 7B of the slider main body 2A without forming stepped portions at the joining portions.

An infinite circulating route is formed by the ball rolling path 6A, the ball circulating path 9A, and the ball passage hole 7A, and another infinite circulating route is formed by the ball rolling path 6B, the ball circulating path 9B, and the ball passage hole 7B. A multiplicity of balls B are loaded or inserted in these infinite circulating routes, as shown in FIG. 4.

Figure 4:
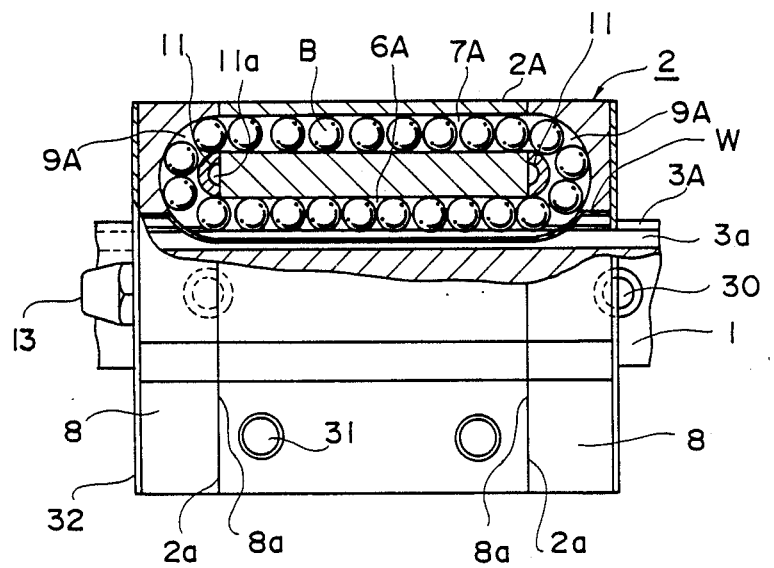
FIG. 4 is a plane view including a partial cross section of a main part of a linear guide apparatus in the embodiment of the present invention.
Figure 5:
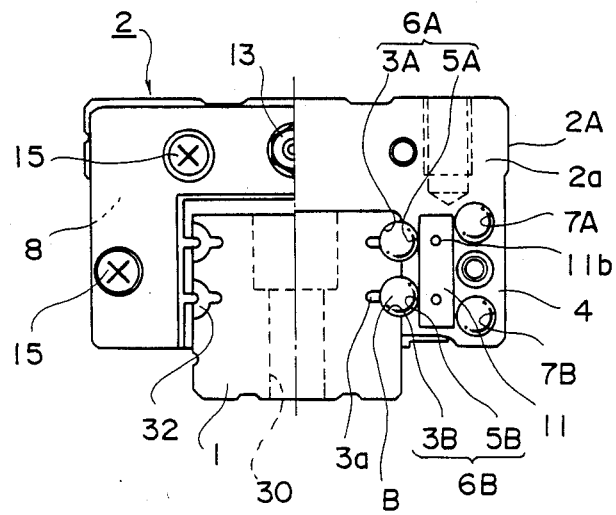
FIG. 5 is a front view of the linear guide apparatus in the embodiment of the present invention with the right-half portion of the end cap removed.

In FIGS. 4 and 5, reference numeral 30 designates a through hole for inserting a bolt for securing the guide rail 1 to a base table or the like (not shown), when the linear guide apparatus is to be used, and numeral 31 designates a through hole for a bolt for fixing a driven member such as a table or the like to the slider 2. Further, reference numeral 32 designates a wiper seal made of synthetic rubber attached to the end cap 8 to wipe the ball rolling grooves 3A and 3B of the guide rail 1 and to prevent foreign matter from intruding therein.

Next, the operation in the embodiment will be described.

The end cap 8 is fixed to the slider main body 2A with end surfaces 2a and 8a in contact with each other by inserting the small screws 15 into the through holes 16A and 16B and by tightening the screws 15. As a result, when the end cap 8 is pressed against the slider main body 2A, the band-shaped protrusion 20 which is formed integrally along the feed oil channel 12 of the end cap 8 is deformed elastically to fill up a minute gap between both joining end surfaces caused by the roughness of the surfaces, an error in flatness and the like. As a result, the leakage of lubricating oil injected into the feed oil channel 12 from the feed oil nipple 13 can be prevented completely.

When the slider 2 on the guide rail 1 is moved in the axial direction, the balls B inserted in the ball rolling paths 6A and 6B roll, due to the movement of the slider 2, and move relative to the slider 2 in a direction opposite to the direction of movement of the slider 2. At the end portion of the slider 2, the balls B are guided by the ball scooping protruding portions 21A and 21B to change the direction. Thus, the balls B make a U-turn along the ball circulating paths 9A and 9B. The balls B pass through the ball passage hole 7A and 7B of the slider main body 2A, and make the U-turn again due to the ball circulating paths 9A and 9B of the end cap 8 to return to the ball rolling paths 6A and 6B. In this manner, the balls B repeat a circulating movement while continuing to roll.

In this case, the lubricating oil in the feed oil channel 12 is supplied to the balls B in the ball circulating paths 9A and 9B via the oil passing channel 11a and the through hole 11b so as to assure smooth rolling of the balls B.

In this embodiment, two parallel band-shaped protrusions 20 are formed on each of the lands 17 at both sides of the feed oil channel 12. By virtue of this, it is possible to prevent oil leakage and to supply oil reliably regardless of the fixing attitude or orientation of the linear guide apparatus (i.e., whether it is horizontal or vertical).

The number of the band-shaped protrusions is determined by taking into consideration the viscosity of the lubricating oil to be used, operating conditions, etc. However, one ridge of the band-shaped protrusions on each of the lands may be sufficient, or two or more band-shaped protrusions may be formed. In either case, in forming the band-shaped protrusion 20, for preventing the oil leak, it is only necessary to engrave a corresponding shape in a molding tool for injection molding of the end cap 8. Thus, there is no need to increase the number of parts especially, and the oil leak can be prevented reliably.

Furthermore, the position for attaching the feed oil nipple 13 is not limited to the center of the front surface of the end cap 8, and in some cases, it may be attached to the side of the end cap 8 by working a nipple fixing hole at the intended position. Also in such cases, the present invention can be applied very effectively.

As described in the foregoing, in the present invention, the band-shaped protrusions are formed integrally at both sides of the feed oil channel of the end cap which is a product of injection molding of synthetic resin. Accordingly, even when a lubricant of a liquid type which is easily impregnated evenly to every portion is used, it is possible to prevent oil leakage completely without requiring a special sealing member. Consequently, the advantage is provided in that the oil is supplied to the many balls satisfactorily which roll and move in a long train, and smooth rolling of the balls, and therefore, smooth operation and long life of the linear guide apparatus can be insured.

While certain embodiments of the invention have been described in detail above in relation to linear guide apparatus, it will be apparent to those skilled in the art that the disclosed embodiment may be modified. Therefore, the foregoing description is to be considered exemplary rather than limiting, and the true scope of the invention is that defined in the following claims.

What is claimed is:

1. A linear guide apparatus comprising:
   an elongated guide rail having ball rolling grooves formed axially in both side surfaces;
   a slider main body mounted movably on said guide rail, said slider main body having ball rolling grooves respectively opposing the ball rolling grooves of said guide rail and having through holes, constituting ball passages, which are in parallel with the ball rolling grooves of said slider main body;
   end caps respectively joined to opposite ends of said slider main body, each of said end caps comprising ball circulating paths which bring corresponding ball passages and ball rolling grooves into communication with each other, and having a feed oil channel for supplying lubricating oil to the ball circulating paths;
   said end cap further comprising bandshaped protrusions formed integrally on lands at both sides of said feed oil channel, said band-shaped protrusions extending along said feed oil channel and serving to prevent leakage of the lubricating oil from said feed oil channel; and
   a multiplicity of balls inserted rollably in the ball rolling grooves.

2. A linear guide apparatus according to claim 1, wherein said band-shaped protrusions are formed in plural on each of the lands at both sides of said feed oil channel.

* * * * *